US006591959B1

(12) United States Patent
Ogura et al.

(10) Patent No.: US 6,591,959 B1
(45) Date of Patent: Jul. 15, 2003

(54) ESCALATOR WITH HIGH SPEED INCLINDED SECTION

(75) Inventors: Manabu Ogura, Tokyo (JP); Takashi Yumura, Tokyo (JP); Yasumasa Haruta, Tokyo (JP); Tatsuya Yoshikawa, Tokyo (JP); Shinji Nagaya, Tokyo (JP); Joichi Nakamura, Fukuoka (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/273,324

(22) Filed: Oct. 18, 2002

(30) Foreign Application Priority Data

Jan. 23, 2002 (JP) ...................................... 2002-014674

(51) Int. Cl.[7] ................................................ B65G 21/12
(52) U.S. Cl. ....................................................... 198/334
(58) Field of Search ................................ 198/321, 326, 198/334

(56) References Cited

U.S. PATENT DOCUMENTS 3,709,150 A * 1/1973 Colombot ............... 198/334 X
4,953,685 A * 9/1990 Johnson .................. 198/334 X
5,115,899 A * 5/1992 Nakatani .................... 198/334

FOREIGN PATENT DOCUMENTS

JP 51-116586 10/1976

* cited by examiner

*Primary Examiner*—James R. Bidwell
(74) *Attorney, Agent, or Firm*—Leydig, Voit & Mayer, Ltd.

(57) ABSTRACT

In an escalator with a high speed inclined section, assuming that an upper-step-side end of a tread is the origin of a coordinate system when a step is seen from a side with the tread being horizontal and on an upper side, a riser passes a point whose horizontal and vertical coordinates can be expressed as (kr cos $\alpha_m$, −kr sin $\alpha_m$) (where k is a speed change ratio; r is a distance between the step link roller shafts of steps adjacent to each other in upper and lower landing sections; and $\alpha_m$ is an inclination angle of an intermediate inclined section).

4 Claims, 7 Drawing Sheets

ESCALATOR WITH HIGH SPEED INCLINDED SECTION

BACKGROUND OF THE INVENTION

1. Field of the Invention

This invention relates to an escalator with a high speed inclined section in which the steps move faster in the intermediate inclined section than in the upper and lower landing sections.

2. Description of the Related Art

Nowadays, a large number of escalators of great height are installed in subway stations or the like. In an escalator of this type, the passenger is obliged to stand on a step for a long period of time, which is often rather uncomfortable. In view of this, a high-speed escalator has been developed. However, in such a high-speed escalator, there is a limitation regarding the traveling speed from the viewpoint of allowing the passengers to get off and on safely.

In view of this, there has been proposed an escalator with a high speed inclined section which is driven at low speed in the upper and lower landing sections where the passenger gets on or of f, accelerated or decelerated in the upper and lower curved sections, and driven at high speed in the intermediate inclined section, whereby the requisite time for the passenger to ride on the escalator is shortened. An example of such an escalator with a high speed inclined section is disclosed in Japanese Patent Application Laid-open No. Sho 51-116586.

However, conventional escalators with a high speed inclined section only exhibit a mechanism for realizing a change in the speed of the steps. Thus, if this speed changing mechanism is simply applied to an ordinary escalator, there is the danger, for example, of a gap being generated between a tread and a riser of an upper adjacent step or interference occurring between adjacent steps.

SUMMARY OF THE INVENTION

The present invention has been made in view of the above-mentioned problems, and an object of the present invention is to obtain an escalator with a high speed inclined section which is capable of preventing interference of a tread with a riser of an adjacent step or generation of a gap between the riser and the tread in upper and lower landing sections and intermediate inclined sections.

To this end, according to one aspect of the present invention, there is provided an escalator with a high speed inclined section, wherein assuming that an upper-step-side end of a tread is the origin of a coordinate system when a step is seen from a side with the tread being horizontal and on the upper side, a riser passes a point whose horizontal and vertical coordinates can be expressed as follows:

$$(kr\cos\alpha_m,\ -kr\sin\alpha_m)$$

(where k is a speed change ratio; r is a distance between the step link roller shafts of the steps adjacent to each other in upper and lower landing sections; and $\alpha_m$ is an inclination angle of a intermediate inclined section).

Accordingly, it is possible to prevent the tread from interfering with the riser of the adjacent step and to prevent generation of a gap between the riser and the tread in the upper and lower landing sections and the intermediate inclined section.

According to another aspect of the present invention, there is provided an escalator with a high speed inclined section, wherein assuming that, when steps are seen from a side, a point spaced apart horizontally by −r and vertically by $-R_1$ from a border point which is in movement locus of an axis of a step link roller shaft and which is between an upper landing section and an upper curved section is the origin of a coordinate system and that the horizontal and vertical coordinates of one end M and the other end M' of a movement locus of a link connection point in a speed changing region of an upper curved section are:

$$M(x_M,y_M),\ M'(x_M',y_M')$$

the following equations hold true:

$$x_M=\{r^2+L_1^2-(kr-L_1)^2\}/2r;$$

$$y_M=R_1-\sqrt{(L_1^2-x_M^2)},$$

$$x_M'=r+R_1\sin\alpha_m+L_1\cos\alpha_m,\ \text{and}$$

$$y_M'=R_1\cos\alpha_m-L_1\sin\alpha_m$$

(where r is the distance between the step link roller shafts in the upper and lower landing sections; $L_1$ is the length between the step link roller shaft and the link connection point in a first link; k is a speed change ratio; and $R_1$ is a radius of curvature of the upper curved section in the movement locus of the axis of the step link roller shaft).

Accordingly, in the upper and lower landing sections and an intermediate inclined section, it is possible to prevent interference of the tread with a riser of the adjacent step and generation of a gap between the riser and the tread.

According to a still further aspect of the present invention, there is provided an escalator with a high speed inclined section, wherein assuming that, when steps are seen from a side, a point spaced apart horizontally by r and vertically by $R_2$ from a border point which is in movement locus of an axis of a step link roller shaft and which is between a lower landing section and a lower curved section is the origin of a coordinate system and that horizontal and vertical coordinates of one end N and the other end N' of a line indicating a movement locus of a link connection point in a speed changing region of the lower curved section are:

$$N(x_N,y_N),\ N'(x_N',y_N')$$

the following equations hold true:

$$x_N=-r+\{r^2+L_1^2-(kr-L_1)^2\}/2r;$$

$$y_N=-R_2-\sqrt{(L_1^2-x_N^2)},$$

$$x_N'=-r-R_2\sin\alpha_m-(kr-L_1)\cos\alpha_m,\ \text{and}$$

$$y_N'=-R_2\cos\alpha_m+(kr-L_1)\sin\alpha_m$$

(where r is the distance between the step link roller shafts in the upper and lower landing sections; $L_1$ is the length between the step link roller shaft and the link connection point in a first link; k is a speed change ratio; and $R_2$ is a radius of curvature of the lower curved section in the movement locus of the axis of the step link roller shaft).

Accordingly, in the upper and lower landing sections and an intermediate inclined section, it is possible to prevent interference of the tread with a riser of the adjacent step and generation of a gap between the riser and the tread.

DETAILED DESCRIPTION OF THE PREFERRED EMBODIMENTS

Embodiments of this invention will be described with reference to the drawings.

Embodiment 1

Figure 1:
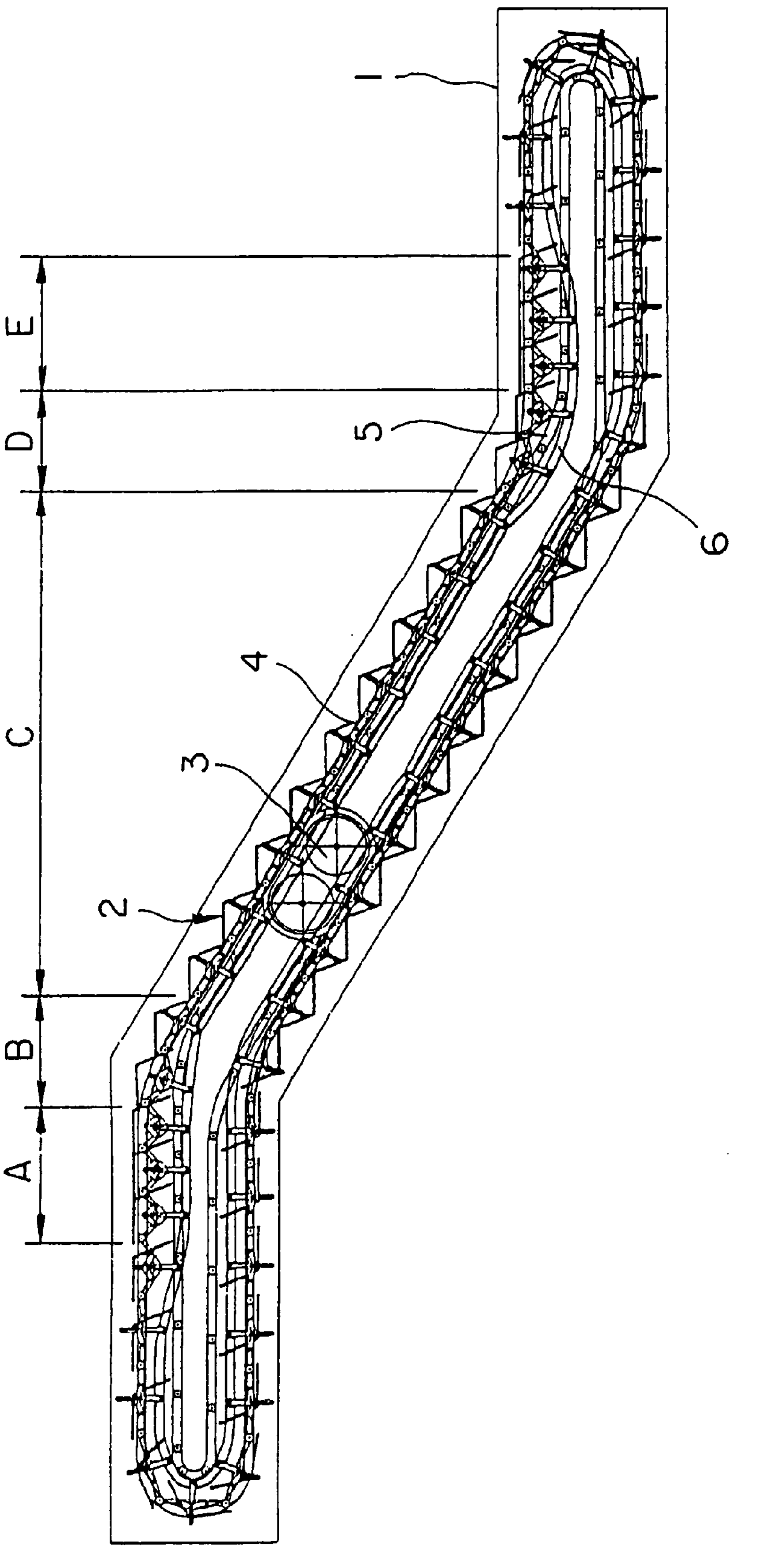
FIG. 1 is a schematic side view of an escalator with a high speed inclined section according to an embodiment of this invention.

FIG. 1 is a schematic side view of an escalator with a high speed inclined section according to an embodiment of this invention. In the drawing, a main frame 1 is provided with a plurality of steps 2 connected together in an endless fashion. The steps 2 are driven by a drive unit (step driving means) 3 and circulated.

The main frame 1 is provided with a pair of main tracks 4 forming a loop track for the steps 2, a pair of trailing tracks 5 for controlling the attitude of the steps 2, and a pair of auxiliary tracks 6 for varying the distance between adjacent steps 2.

The loop track for the steps 2 has a forward path section, a return track section, an upper reversing section, and a lower reversing section. The forward path section of the loop track has an upper landing section (upper horizontal section) A, an upper curved section B, an intermediate inclined section (fixed inclination section) C, a lower curved section D, and a lower landing section (lower horizontal section) E. The intermediate inclined section C is situated between the upper landing section A and the lower landing section E. The upper curved section B is situated between the upper landing section A and the intermediate inclined section C. The lower curved section D is situated between the lower landing section E and the intermediate inclined section C.

Figure 2:
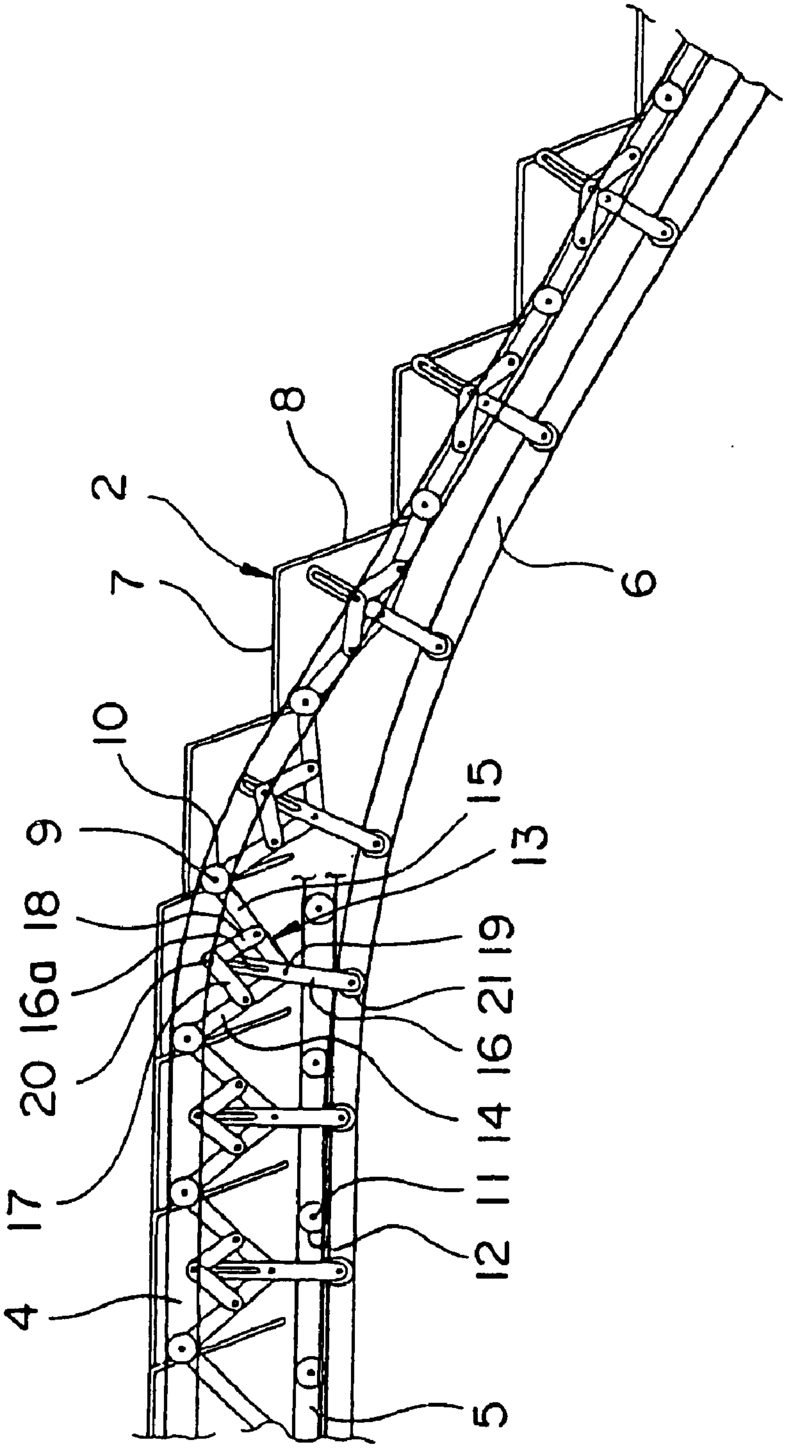
FIG. 2 is an enlarged side view of the portion around an upper curved section of FIG. 1.
Figure 3:
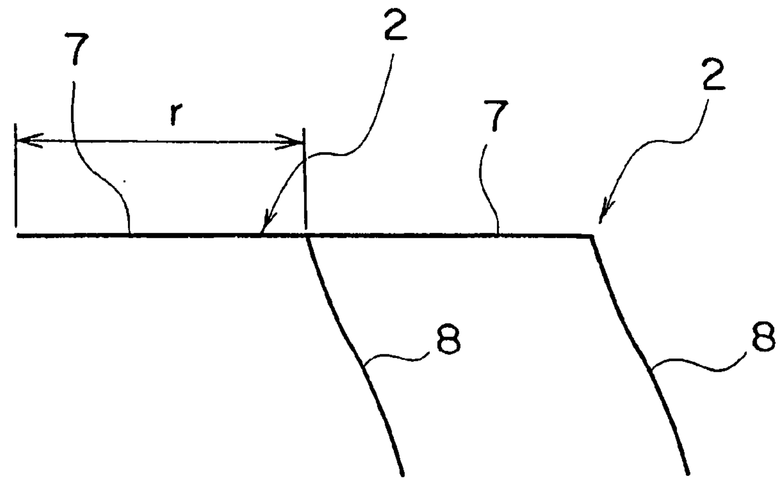
FIG. 3 is an explanatory diagram illustrating the positional relationship between adjacent steps in upper and lower landing sections of FIG. 1.

Next, FIG. 2 is an enlarged side view of the portion around the upper curved section B of FIG. 1. Each step 2 has a tread 7 for carrying the passenger, a riser 8 formed by bending the lower step side portion of the tread 7, a step link roller shaft 9 extending in the width direction of the tread 7, a pair of step link rollers 10 rotatable around the step link roller shaft 9, a trailing roller shaft 11 parallel to the step link roller shaft 9, and a pair of trailing rollers 12 rotatable around the trailing rollers 11. The step link rollers 10 roll on the main tracks 4. The trailing rollers 12 roll on the trailing tracks 5.

The step link roller shafts 9 of adjacent steps 2 are connected to each other by a pair of link mechanisms (folding links) 13. Each link mechanism 13 has first through fifth links 14 through 18.

One end portion of the first link 14 is rotatably connected to the step link roller shaft 9. The other end portion of the first link 14 is rotatably connected to the middle portion of the third link 16 through a shaft 19. One end portion of the second link 15 is rotatably connected to the step link roller shaft 9 of the adjacent step 2. The other end portion of the second link 15 is rotatably connected to the middle portion of the third link 16 through the shaft 19.

One end portion of the fourth link 17 is rotatably connected to the middle portion of the first link 14. One end portion of the fifth link 18 is rotatably connected to the middle portion of the second link 15. The other end portions of the fourth and fifth links 17 and 18 are connected to one end portion of the third link 16 through a slide shaft 20.

In one end portion of the third link 16, there is provided a guide groove 16*a* for guiding the sliding of the slide shaft 20 in the longitudinal direction of the third link 16. At the other end of the third link 16, there is provided a rotatable auxiliary roller 21. The auxiliary roller 21 is guided by the auxiliary track 6.

Through the guiding of the auxiliary roller 21 by the auxiliary track 6, the link mechanism 13 undergoes deformation so as to fold and stretch, and the distance between the step link roller shafts 9, that is, the distance between the adjacent steps 2, is varied. In other words, the line of the auxiliary track 6 is designed such that the distance between the adjacent steps 2 varies. The step speed changing means in Embodiment 1 has the auxiliary track 6, the link mechanism 13, and the auxiliary roller 21.

Next, the operation of this escalator will be described. The speed of the steps 2 is varied by varying the distance between the step link roller shafts 9 of the adjacent steps 2. That is, in the upper landing section A and the lower landing section E where the passenger gets on or off, the distance between the step link roller shafts 9 is minimum, and the steps 2 move at low speed. In the intermediate inclined section C, the distance between the step link roller shafts 9 is maximum, and the steps 2 move at high speed. In the upper curved section B and the lower curved section D constituting the speed changing portions, the distance between the step link roller shafts 9 is varied, and the steps 2 are accelerated or decelerated.

The first, second, fourth, and fifth links 14, 15, 17, and 18 form a so-called pantograph type quadruple link mechanism, making it possible to increase or decrease the angle made by the first and second links 14 and 15, with the third link 16 serving as the axis of symmetry, whereby it is possible to vary the distance between the step link roller shafts 9 connected to the first and second links 14 and 15.

In the landing sections A and E of FIG. 1, the distance between the step link roller shafts 9 of the adjacent steps 2 is minimum. When, from this state, the distance between the main track 4 and the auxiliary track 6 is diminished, the link mechanism 13 operates like the framework of an umbrella when it is opened, and the distance between the step link roller shafts 9 of the adjacent steps 2 increases.

In the intermediate inclined section C of FIG. 1, the distance between the main track 4 and the auxiliary track 6 is minimum, and the distance between the step link roller shafts 9 of the adjacent steps 2 is maximum. Thus, in this region, the speed of the steps 2 is maximum. Further, in this condition, the first and second links 14 and 15 are substantially arranged in a straight line.

Next, the method of determining the configuration of the riser 8 according to Embodiment 1 will be described. FIG.

Figure 4:
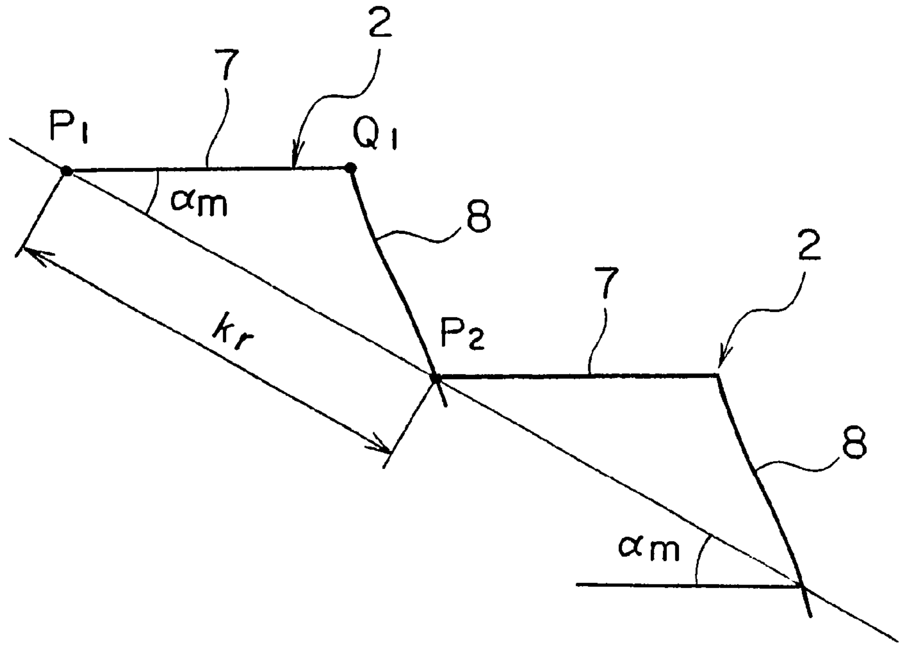
FIG. 4 is an explanatory diagram illustrating the positional relationship between adjacent steps in the intermediate inclined section of FIG. 1.

3 is an explanatory diagram showing the positional relationship between the adjacent steps 2 in the upper and lower landing sections A and E of FIG. 1, and FIG. 4 is an explanatory diagram showing the positional relationship between the adjacent steps 2 in the intermediate inclined section C of FIG. 1.

In the drawings, in the upper and lower landing sections A and E, the steps 2 are arranged horizontally with no gaps therebetween, and the distance between the step link roller shafts 9 of the adjacent steps 2 (or the distance between identical corresponding points) is r. Further, suppose the speed changing ratio (the ratio of the moving speed of the steps 2 in the intermediate inclined section C to the moving speed of the steps 2 in the upper and lower landing sections A and E) is k. Further, suppose the inclination angle of the intermediate inclined section is $\alpha_m$.

In this case, the distance between the adjacent steps 2 in the intermediate inclined section C is kr. Further, assuming that the upper-step-side end $P_1$ of the tread 7 of the step 2 situated on the upper step side is the origin of an coordinate system, the coordinates of the upper-step-side end $P_2$ of the tread 7 of the step 2 situated on the lower step side can be expressed as follows:

$$(kr\cos\alpha_m, -kr\sin\alpha_m) \qquad (1)$$

Further, when the step 2 is seen from the side with the tread 7 being horizontal and on the upper side, the upper end of the riser 8 is situated at the lower-step-side end $Q_1$ of the tread 7. Thus, the configuration of the riser 8 is determined so as to be a straight line or a curved line passing the lower-step-side end $Q_1$ of the tread 7 and the upper-step-side end $P_2$ of the tread 7 of the step 2 adjacent on the lower step side, whereby it is possible to prevent the tread 7 from interfering with the riser 8 of the adjacent step 2 and to prevent generation of a gap between the riser 8 and the tread 7 in the upper and lower landing sections A and E and the intermediate inclined section C.

Embodiment 2

Figure 5:
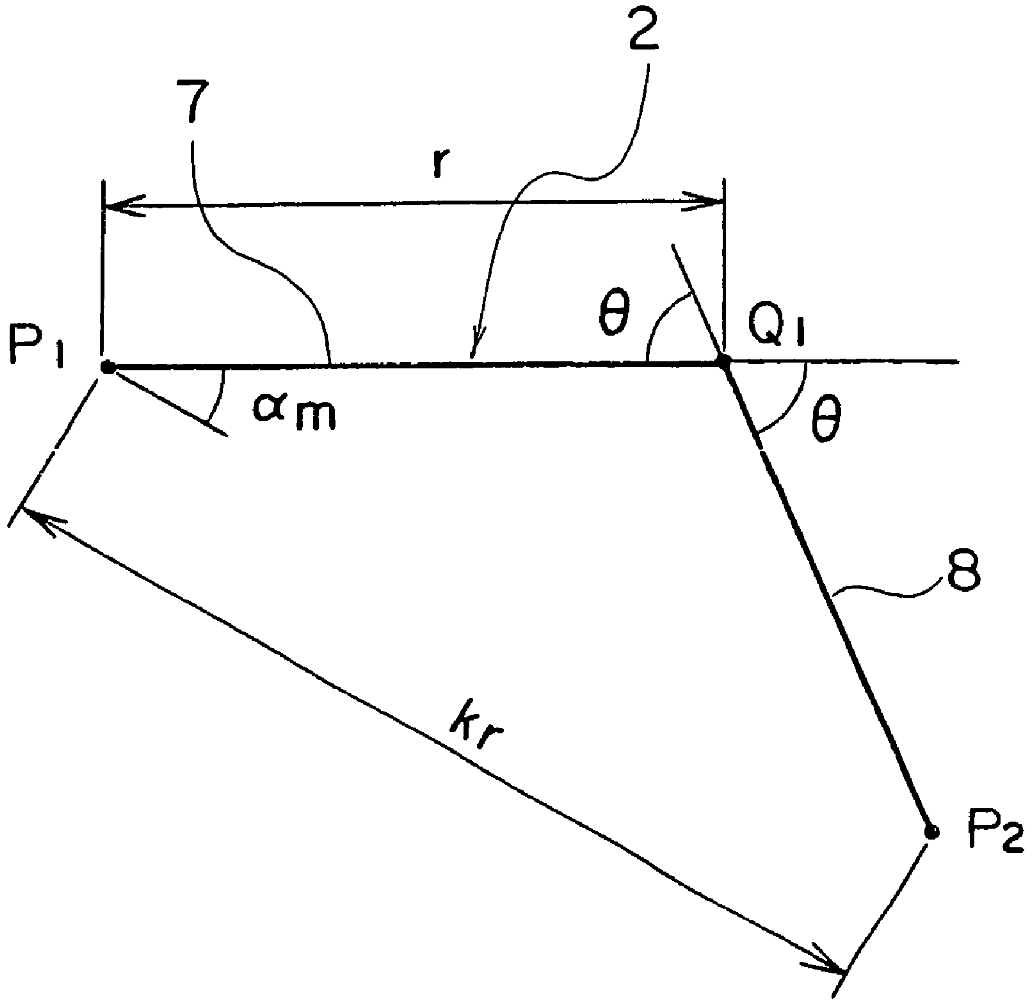
FIG. 5 is an explanatory diagram illustrating the riser configuration of a step according to Embodiment 2 of this invention.

Next, FIG. 5 is an explanatory diagram showing the riser configuration in the escalator with a high speed inclined section of Embodiment 2 of this invention. The general construction of the escalator is the same as that of Embodiment 1. In Embodiment 2, the riser 8 has a flat configuration. That is, when the step 2 is seen from the side, the riser 8 exhibits a straight line passing the lower-step-side end $Q_1$ of the tread 7 and the upper-step-side end $P_2$ of the tread 7 of the step 2 adjacent on the lower step side.

Assuming that the angle made by the tread 7 and the riser 8 is θ, $$\tan\theta = kr\sin\alpha_m/(kr\cos\alpha_m - r) \qquad (2)$$

Thus, θ can be expressed as follows:

$$\theta = k\sin\alpha_m/(k\cos\alpha_m - 1) \qquad (3)$$

In this way, when a flat riser 8 is used, the angle θ of the riser 8 with respect to the tread 7 is restricted by the speed changing ratio k and the inclination angle $\alpha_m$ of the intermediate inclined section C, whereby it is possible to prevent the tread 7 from interfering with the riser 8 of the adjacent step 2 and to prevent generation of a gap between the riser 8 and the tread 7 in the upper and lower landing sections A and E and the intermediate inclined section C.

Embodiment 3

Figure 6:
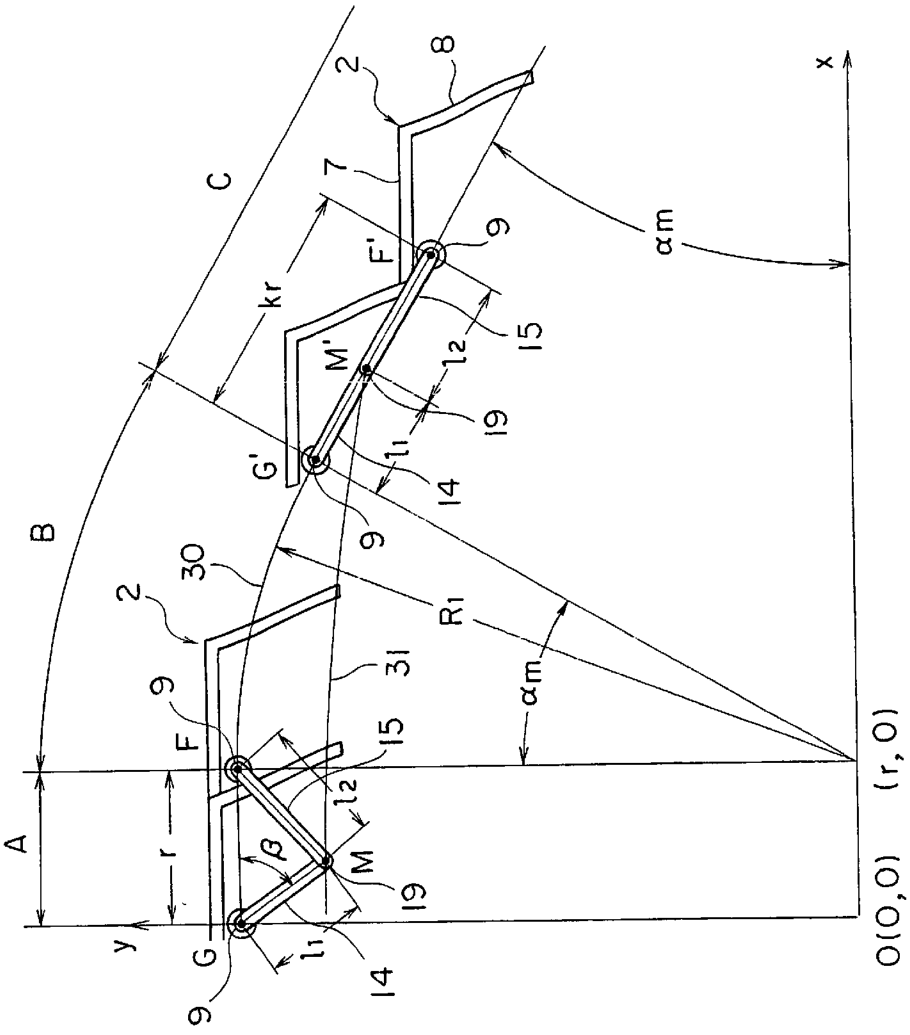
FIG. 6 is an explanatory diagram illustrating the movement track of a link connecting point near an upper curved section of an escalator with a high speed inclined section according to Embodiment 3 of this invention.

Next, FIG. 6 is an explanatory diagram showing the movement locus of the link connection point around the upper curved section of an escalator with a high speed inclined section according to Embodiment 3 of this invention. The general construction of the escalator is the same as that of Embodiment 1. In the drawing, the axis of the step link roller shaft 9 moves along the movement locus 30. The shaft 19, which is the link connection point (bending point) of the first link 14 and the second link 15, moves along the movement locus 31.

In the upper landing section A, the adjacent steps 2 are arranged horizontally without any gap therebetween, and the distance between the axes of the step link roller shafts 9 (which is substantially equal to the length of the tread 7) is r. Further, suppose the speed changing ratio (the ratio of the moving speed of the steps 2 in the intermediate inclined section C to the moving speed of the steps 2 in the upper and lower landing sections A and E) is k. Further, suppose the inclination angle of the intermediate inclined section C is $\alpha_m$. And, further, suppose the radius of curvature of the movement locus 30 in the upper curved section B is $R_1$.

In this case, the distance between the step link roller shafts 9 in the intermediate inclined section C is kr. Further, suppose the length of the portion of the first link 14 from the step link roller shaft 9 to the link connection point (which is substantially equal to the length of the first link 14) is $L_1$, and suppose the length of the portion of the second link 15 from the step link roller shaft 9 to the link connection point (which is substantially equal to the length of the second link 15) is $L_2$. Further, in the intermediate inclined section C, the step link roller shaft 9 and the link connection point in the first link 14 and the step link roller shaft 9 in the second link 15 are defined to be in a straight line. In this case, the length $L_2$ can be expressed as follows:

$$L_2 = kr - L_1 \qquad (4)$$

Next, the coordinates of one end M and the other end M' of the movement locus 31 of the link connection point in the speed changing region are obtained. It is to be assumed that the speed change in the upper portion of the escalator (the folding and stretching of the first link 14 and the second link 15) is completed exclusively in the upper curved section B. Further, the origin of the coordinate system is the point spaced apart horizontally (in the x-direction) by −r and vertically (in the y-direction) by $-R_1$ from the border point F which is in the movement locus 30 of the axis of the step link roller shaft 9 and which is between the upper landing section A and the upper curved section B.

Here, a case is considered in which the steps 2 are accelerated from the upper landing section A toward the intermediate inclined section C. When the axis of the step link roller shaft 9 of the lower-side step 2 of the adjacent steps 2 in the upper landing section A is positioned at the border point F $(r, R_1)$, which is the acceleration start point, the axis of the step link roller shaft 9 of the upper-side step 2 is positioned at the point $G(x_G, y_G) = (0, R_1)$. At this time, the link connection point (shaft 19) is positioned at the start point M of the speed change region of the movement locus 31.

Assuming that the angle made by segment GF and segment GM is β, the following equation is derived from the second law of cosines regarding the triangle FGM:

$$\cos\beta = (r^2 + L_1^2 - L_2^2)/2rL_1 = \{r^2 + L_1^2 - (kr - L_1)^2\}/2rL_1 \qquad (5)$$

Thus, the horizontal and vertical coordinates ($x_M$, $y_M$) of the point M are expressed as follows:

$$x_M = x_G + L_1 \cos\beta = \{r^2 + L_1^2 - (kr - L_1)^2\}/2r \quad (6)$$

$$y_M = y_G - \sqrt{(L_1^2 - x_M^2)} = R_1 - \sqrt{(L_1^2 - x_M^2)} \quad (7)$$

When the axis of the step link roller shaft 9 of the upper-side step 2 is positioned at the border point G' that is between the upper curved section B and the intermediate inclined section C, the acceleration of the lower-side step 2 has been completed, and the link connection point is positioned at the end point M' of the movement locus 31. At this time, the coordinates of the point G', ($x_G'$, $y_G'$), can be expressed as follows:

$$x_G' = r + R_1 \sin\alpha_m \quad (8)$$

$$y_G' = R_1 \cos\alpha_m \quad (9)$$

Further, in the intermediate inclined section C, the step link roller shaft 9 and the link connection point in the first link 14 and the step link roller shaft 9 in the second link 15 are in a straight line, so that M' is a point which is in the movement locus 30 of the axis of the step link roller shaft 9 and in the intermediate inclined section C. Thus, the coordinates of the point M', ($x_M'$, $y_M'$), can be expressed as follows:

$$x_M' = x_G' + L_1 \cos\alpha_m = r + R_1 \sin\alpha_m + L_1 \cos\alpha_m \quad (10)$$

$$y_M' = y_G' - L_1 \sin\alpha_m = R_1 \cos\alpha_m - L_1 \sin\alpha_m \quad (11)$$

In this escalator with a high speed inclined section, the movement locus 31 of the link connection point in the speed change region of the upper portion of the escalator is a straight line or a curved line connecting the end points M and M'. That is, the positions of the end points of the link connection point are determined such that the speed change of the steps 2 in the upper portion of the escalator is effected exclusively in the upper curved section B (the region where the steps 2 undergo a change in difference in level). Thus, in the upper and lower landing sections A and E and the intermediate inclined section C, it is possible to prevent interference of the tread 7 with the riser 8 of the adjacent step 2 and generation of a gap between the riser 8 and the tread 7.

Embodiment 4

Figure 7:
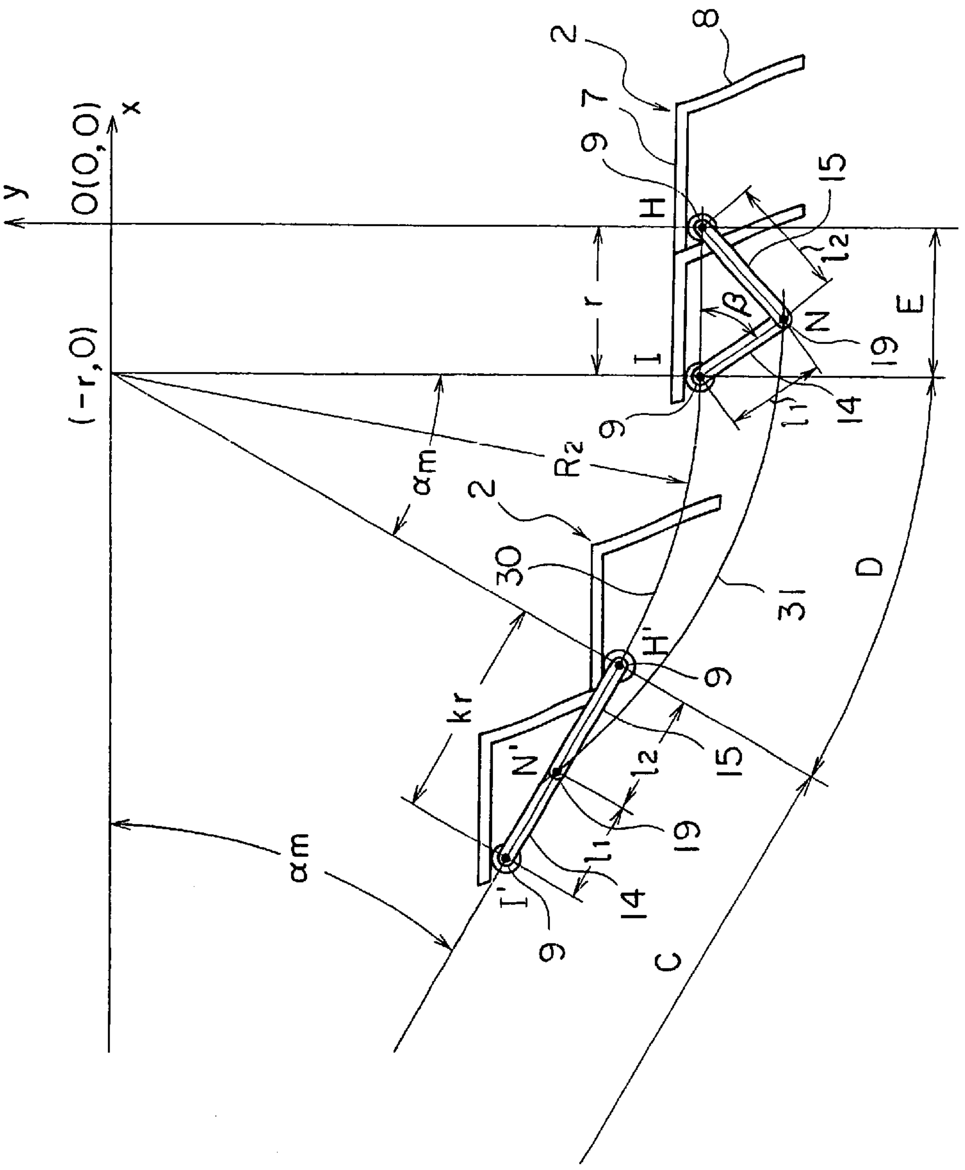
FIG. 7 is an explanatory diagram illustrating the movement track of a link connecting point near a lower curved section of an escalator with a high speed inclined section according to Embodiment 4 of this invention.

Next, FIG. 7 is an explanatory diagram showing the movement locus of the link connection point near the lower curved section of an escalator with a high speed inclined section according to Embodiment 4 of this invention. The general construction of the escalator is the same as that of Embodiment 1. In the drawing, the speed change in the lower portion of the escalator is completed exclusively in the lower curved section D. Suppose the radius of curvature of the movement locus 30 of the axis of the step link roller shaft 9 in the lower curved section D is $R_2$. Further, the origin of the coordinate system is the point spaced apart horizontally (in the x-direction) by r and vertically (in the y-direction) by $R_2$ from the border point I which is in the movement locus 30 and which is between the lower landing section E and the lower curved section D.

As in Embodiment 3, one end N($x_N$, $y_N$) and the other end N' ($x_N'$, $y_N'$) of the movement locus 31 of the link connection point in the speed changing region of the lower portion of the escalator are obtained as follows:

$$x_N = -r + \{r^2 + L_1^2 - (kr - L_1)^2\}/2r \quad (12)$$

$$y_N = -R_2 - \sqrt{(L_1^2 - x_N^2)} \quad (13)$$

$$x_n' = -r - R_2 \sin\alpha_m - (kr - L_1)\cos\alpha_m \quad (14)$$

$$y_n' = -R_2 \cos\alpha_m + (kr - L_1)\sin\alpha_m \quad (15)$$

In this escalator with a high speed inclined section, the movement locus 31 of the link connection point in the speed changing region of the lower portion of the escalator is a straight line or a curved line having the points N and N' as its ends. That is, the positions of the end points of the link connection point are determined such that the speed change of the steps 2 in the lower portion of the escalator is effected exclusively in the lower curved section D (the region where the steps 2 undergo a change in difference in level). Thus, in the upper and lower landing sections A and E and the intermediate inclined section C, it is possible to prevent interference of the tread 7 with the riser 8 of the adjacent step 2 and generation of a gap between the riser 8 and the tread 7.

While in Embodiments 3 and 4 the positions of the end points of the movement locus of the link connection point in the speed changing region (upper and lower curved sections) are obtained, it is also possible to geometrically obtain, from the positions of the points obtained, the positions of the end points of the movement locus of the axis of the auxiliary roller and the positions of the end points of the auxiliary track in the speed changing region.

Embodiment 5

Figure 8:
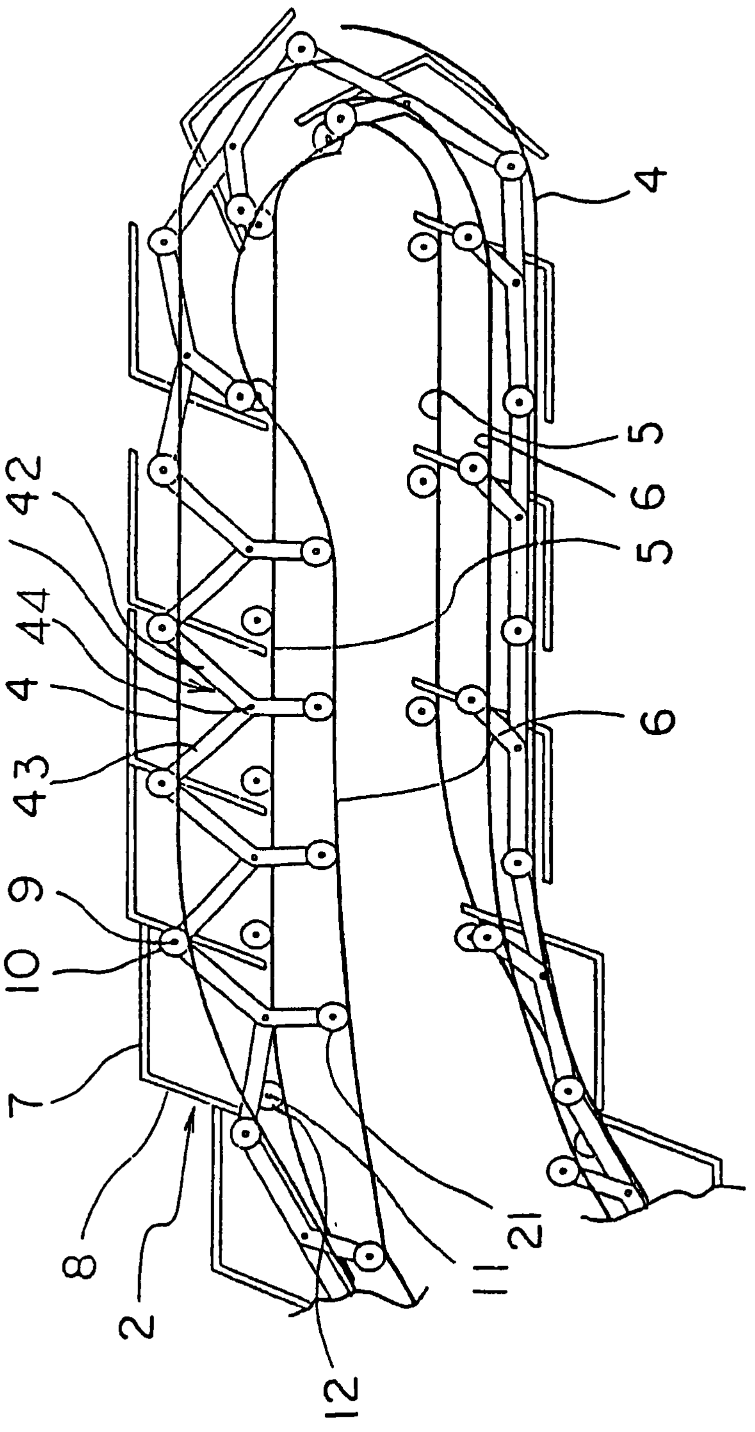
FIG. 8 is a side view of an upper reversing section of an escalator with a high speed inclined section according to Embodiment 5 of this invention.

Further, while in the above examples a pantograph type quadruple link mechanism is used, the construction of the link mechanism is not restricted to this; it is also possible, for example, to use a link mechanism 41 as shown in FIG. 8.

The link mechanism 41 has a first link 42 with a bent middle portion and a second link 43 of a linear configuration. One end portion of the first link 42 is connected to the step link roller shaft 9. An auxiliary roller 21 is mounted to the other end portion of the first link 42. One end portion of the second link 43 is connected to the step link roller shaft 9 of the adjacent step 2. The other end portion of the second link 43 is connected to the link connection point in the middle portion of the first link 42 through a shaft 44. The step speed changing means of Embodiment 5 has the auxiliary track 6, the link mechanism 41, and the auxiliary roller 21.

Even in the case in which this link mechanism 41 is used, it is possible, as in Embodiments 3 and 4, to obtain the end points of the locus of the link connection point in the speed changing region, whereby it is possible to prevent interference of the tread 7 with the riser 8 of the adjacent step 2 and generation of a gap between the riser 8 and the tread 7 in the upper and lower landing sections and the intermediate inclined section.

What is claimed is:

1. An escalator with a high speed inclined section, comprising:

- a plurality of steps, each step having a tread for carrying a passenger, a riser at a lower-step-side end of the tread, a step link roller shaft, and a step link roller rotatable around the step link roller shaft, the steps being connected together in an endless fashion for circulation;
- a main track which forms a loop track including an upper landing section, a lower landing section, and an intermediate inclined section situated between the upper landing section and the lower landing section and which guides the step link roller; and step speed changing means which varies distance between adjacent steps to vary moving speed of the steps so that a speed change ratio of the moving speed of the steps in the intermediate inclined section to the moving speed in the upper and lower landing sections is fixed, wherein, assuming that an upper-step-side end of the tread of a step is an origin of a coordinate system when the step is seen from a side with the tread being horizontal and on the upper side, the riser passes a point having horizontal and vertical coordinates expressed as $$(kr\cos\alpha_m, -kr\sin\alpha_m)$$

where k is the speed change ratio, r is distance between the step link roller shafts of adjacent steps in the upper and lower landing sections, and $\alpha_m$ is inclination angle of the intermediate inclined section.

2. The escalator with a high speed inclined section according to claim 1, wherein the riser has a planar configuration and wherein an angle θ between the tread and the riser is $$\theta=k\sin\alpha_m/(k\cos\alpha_m-1).$$

3. An escalator with a high speed inclined section, comprising:

a plurality of steps, each step having a tread for carrying a passenger, a riser at a lower-step-side end of the tread, a step link roller shaft, and a step link roller rotatable around the step link roller shaft, the steps being connected together in an endless fashion for circulation;

a main track which forms a loop track including an upper landing section, a lower landing section, an intermediate inclined section situated between the upper landing section and the lower landing section, an upper curved section situated between the upper landing section and the intermediate inclined section, and a lower curved section situated between the lower landing section and the intermediate inclined section and which guides the main track; and step speed changing means which has a plurality of link mechanisms, each link mechanism having a first link rotatably connected to the step link roller shaft and a second link rotatably connected to a link connection point of the first link and the step link roller shaft of an adjacent step and which varies distance between the adjacent steps to vary moving speed of the steps such that a speed change ratio of the moving speed of the steps in the intermediate inclined section, to the moving speed of the steps in the upper and lower landing sections is fixed, wherein, assuming that, when the steps are seen from a side, a point spaced apart horizontally by −r and vertically by $-R_1$ from a border point, which is in a movement locus of an axis of the step link roller shaft and which is between the upper landing section and the upper curved section, is an origin of a coordinate system, and that horizontal and vertical coordinates of a first end M and a second end M' of a movement locus of the link connection point in a speed changing region of the upper curved section are:

$$M(x_M, y_M),\ M'(x_M', y_M'),\text{ then}$$

$$x_M=\{r^2+L_1^2-(kr-L_1)^2\}/2r;$$

$$y_M=R_1-\sqrt{}(L_1^2x_M^2),$$

$$x_M'=r+R_1\sin\alpha_m+L_1\cos\alpha_m,\text{ and}$$

$$Y_M'=R_1\cos\alpha_m-L_1\sin\alpha_m$$

where r distance-between the step link roller shafts in the upper and lower landing sections, $L_1$ is the length between the step link roller shaft and the link connection point in the first link, k is the speed change ratio, and $R_1$ is a radius of curvature of the upper curved section in the movement locus of the axis of the step link roller shaft.

4. An escalator with a high speed inclined section, comprising:

a plurality of steps, each step having a tread for carrying a passenger, a riserat a lower-step-side end of the tread, a step link roller shaft, and a step link roller rotatable around the step link roller shaft, the steps being connected together in an endless fashion for circulation;

a main track which forms a loop track including an upper landing section, a lower landing section, an intermediate inclined section situated between the upper landing section and the lower landing section, an upper curved section situated between the upper landing section and the intermediate inclined section, and a lower curved section situated between the lower landing section and the intermediate inclined section and which guides the main track; and step speed changing means which has a plurality of link mechanisms, each link mechanism having a first link rotatably connected to the step link roller shaft and a second link rotatably connected to a link connection point of the first link and the step link roller shaft of an adjacent step and which varies distance between the adjacent steps to vary moving speed of the steps such that a speed change ratio of the moving speed of the steps in the intermediate inclined section, to the moving speed of the steps in the upper and lower landing sections is fixed, wherein, assuming that when the steps are seen from a side, a point spaced apart horizontally by r and vertically by $R_2$ from a border point, which is in movement locus of an axis of the step link roller shaft and which is between the lower landing section and the lower curved section, is an origin of a coordinate system, and that horizontal and vertical coordinates of a first end N and a second end N' of a line indicating a movement locus of a link connection point in a speed changing region of the lower curved section are:

$$N(x_N, y_N),\ N'(x_N', y_N'),\text{ then}$$

$$x_N=-r+\{r_2+L_1^2-(kr-L_1)^2\}/2r;$$

$$y_N=-R2-\sqrt{}(L_1^2-x_N^2),$$

$$x_N'-r-R_2\sin\alpha_m-(kr-L_{1)\ \cos\ \alpha m},\text{ and}$$

$$Y_N'=-R_2\cos\alpha_m+(kr-L_1)\sin\alpha_m$$

where r is distance between the step link roller shafts in the upper and lower landing sections, $L_1$ is length between the step link roller shaft and the link connection point in the first link, k is the speed change ratio, and $R_2$ is radius of curvature of the lower curved section in the movement locus of the axis of the step link roller shaft.

* * * * *